(12) United States Patent
Sielermann et al.

(10) Patent No.: US 9,630,780 B2
(45) Date of Patent: Apr. 25, 2017

(54) CLAMP FOR AN ITEM OF LAUNDRY

(71) Applicant: Herbert Kannegiesser GmbH, Vlotho (DE)

(72) Inventors: Jürgen Sielermann, Heubach (DE); Lars Herzog, Bielefeld (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 14/703,936

(22) Filed: May 5, 2015

(65) Prior Publication Data

US 2015/0321851 A1 Nov. 12, 2015

(30) Foreign Application Priority Data

May 9, 2014 (DE) ........................ 10 2014 006 697

(51) Int. Cl.
| | | |
|---|---|---|
| *B66C 1/48* | (2006.01) | |
| *B65G 17/20* | (2006.01) | |
| *D06F 67/04* | (2006.01) | |
| *D06F 93/00* | (2006.01) | |
| *D06F 95/00* | (2006.01) | |
| *D06F 55/02* | (2006.01) | |
| *F16B 2/18* | (2006.01) | |

(52) U.S. Cl.
CPC ............ *B65G 17/20* (2013.01); *D06F 55/02* (2013.01); *D06F 67/04* (2013.01); *D06F 93/00* (2013.01); *D06F 95/00* (2013.01); *F16B 2/185* (2013.01)

(58) Field of Classification Search
CPC ...................................... B65G 17/20

USPC ....... 294/101, 104, 106, 16, 103.1, 901, 902
See application file for complete search history.

(56) References Cited

U.S. PATENT DOCUMENTS

| | | | | |
|---|---|---|---|---|
| 489,782 | A * | 1/1893 | Bahret ................... | A47K 10/12 248/316.3 |
| 1,011,660 | A * | 12/1911 | Strathern ................. | B66C 1/48 294/101 |
| 2,549,918 | A * | 4/1951 | Miller ..................... | B25B 5/08 24/498 |
| 2,618,505 | A * | 11/1952 | Rosenbaum ............. | B66C 1/48 294/104 |
| 2,776,856 | A * | 1/1957 | Ingram .................... | A45F 5/10 294/101 |

(Continued)

FOREIGN PATENT DOCUMENTS

| | | |
|---|---|---|
| GB | 2103072 A | 2/1983 |
| GB | 2243816 A | 11/1991 |
| NL | 8205032 A | 7/1984 |

OTHER PUBLICATIONS

European Patent Office, Europaischer Recherchenberigcht (European Search on related application), Sep. 11, 2015.

*Primary Examiner* — Paul T Chin
(74) *Attorney, Agent, or Firm* — Laurence P. Colton; Smith Tempel Blaha LLC

(57) ABSTRACT

A clamp for feeding items of laundry to a laundry treatment machine that can be easily actuated and that can enhance performance and reliability when items of laundry are fed, for example, to a mangle or the like, by configuring at least one clamping element of the clamp as a clamping lever having an insertion aid with a guideway for the sliding insertion of a section of the item of laundry into a clamp mouth.

18 Claims, 3 Drawing Sheets

(56) References Cited

U.S. PATENT DOCUMENTS

| | | | | | |
|---|---|---|---|---|---|
| 3,262,579 | A | * | 7/1966 | Reich | A47G 25/0657 |
| | | | | | 211/45 |
| 3,414,315 | A | * | 12/1968 | O'Quinn | B66C 1/48 |
| | | | | | 294/104 |
| 4,013,202 | A | * | 3/1977 | Russo | B65G 7/12 |
| | | | | | 294/16 |
| 4,702,508 | A | * | 10/1987 | Weiner | B66C 1/48 |
| | | | | | 116/208 |
| 4,834,442 | A | * | 5/1989 | Choung | B66C 1/48 |
| | | | | | 294/101 |
| 4,938,517 | A | * | 7/1990 | Langloy | B66C 1/48 |
| | | | | | 294/101 |
| 5,226,688 | A | * | 7/1993 | Russo | B65G 7/12 |
| | | | | | 294/104 |
| D443,489 | S | * | 6/2001 | Walser | D8/51 |
| 6,652,016 | B2 | * | 11/2003 | Sbabo | B66C 1/48 |
| | | | | | 294/101 |
| 2014/0291123 | A1 | * | 10/2014 | Olivieri | D06F 67/04 |
| | | | | | 198/617 |

* cited by examiner

CLAMP FOR AN ITEM OF LAUNDRY

STATEMENT OF RELATED APPLICATIONS

This patent application claims priority on and the benefit of German Patent Application No. DE 10 2014 006 697.5 having a filing date of 9 May 2014.

BACKGROUND OF THE INVENTION

Technical Field

The invention relates to a clamp for an item of laundry having a clamp housing, a clamp mouth, and at least one movable clamping element.

Prior Art

Clamps of this type are used in laundries, for example in devices for feeding in particular large items of laundry (bed sheets, tablecloths, etc.) to a mangle or to another laundry treatment machine, but also in the conveying systems as well as in the storage and sorting lines of laundries.

It has been shown that the handling involved for known clamps of this type, above all the manual introduction of a section of the item of laundry into a clamp mouth of the clamp, is relatively complicated and thus time-consuming.

BRIEF SUMMARY OF THE INVENTION

The invention is therefore based on the object of further developing a clamp of the type described at the outset so that it can be easily loaded.

To achieve this object, the clamp according to the invention is a clamp for an item of laundry having a clamp housing, a clamp mouth, and at least one movable clamping element, characterized in that the at least one clamping element is configured as a clamping lever with an insertion aid having a guidance means for the guided insertion of a section of the item of laundry into the clamping mouth. Clamps of this type have a clamp housing with a clamp mouth in which one section of the item of laundry can be held, and at least one movable clamping member. According to the invention, the at least one clamping member is configured as a clamping lever with one insertion aid having a guidance means for the directed insertion of one section of the item of laundry into the clamp mouth. The insertion aid of the clamping lever serves in facilitating the insertion of the item of laundry or one section of the item of laundry. The operator no longer has to precisely guide the section of the item of laundry into an opening of the clamp mouth but instead must merely guide the section of the item of laundry along the guidance means. As soon as the operator has brought a section of the item of laundry, such as a corner, edge or the like, into contact with the guidance means, he only needs to move the item of laundry along the guidance means, whereby the relevant section of the item of laundry is forced, so to speak, into the clamp mouth of the clamp. Preferably the clamp mouth is open in the downward direction, but it can also assume any different orientation.

A further advantageous development of the invention can be one where the guidance means of the insertion aid is configured as a guideway which ascends obliquely from below the clamp housing to the clamp mouth, said guideway preferably extending up to the clamp mouth. On account of the guideway, the item of laundry is directly guided or directed by the guidance means into the clamp mouth. However, it is also conceivable that the guidance means leads only to the clamp mouth but does not extend into it but instead ends in front of it. In both cases, it is ensured that the section of the item of laundry which is taken up by the operator is brought directly into the clamp mouth.

In particular, it is conceivable in the case of the present invention that the guideway lies with its full length below an opening of the clamp mouth. Preferably the guideway extends obliquely below the clamp mouth or clamp housing. In this case the distance of the guideway to the clamp mouth decreases continually. The guideway of the guidance means thereby extends in its length along the dimensions of the clamp housing. This thereby enlarges the target area to which the section of the item of laundry is guided by the operator. Since the distance of the guideway to the clamp mouth decreases continuously, thus directing the section of the item of laundry in the direction of the clamp mouth, the operator requires only a slight expenditure of dexterity and concentration in the feeding operation, in other words, in order to feed the section of laundry it sufficient for it to be moved approximately in the direction of the clamping mouth. The decisive factor is that the guideway of the clamping lever is struck.

It should furthermore be considered particularly advantageous that the obliquely ascending guideway has a linear, or slightly convex or concave, configuration, preferably one similar to that of a skid. This provides the guideway with a continuous run. The guideway of the guidance means can, however, also be configured as a narrow or wide plate. In addition, it is conceivable for the guideway to have a tubular configuration. In order to have as little sliding friction as possible, the guideway is configured to be smooth, in particular comprising metal or plastic. Furthermore, the surface of the guideway can be coated with a synthetic material, in particular Teflon® brand of synthetic material.

The invention makes further provision that a first end of the clamping lever protrudes into the clamp mouth or terminates shortly in front of it, and a second end projects beyond the clamp housing, with the guideway running between the two ends of the clamping lever on the underside of the latter. The first end of the clamping lever facing the clamp mouth can in addition have a hooked or nose-shaped projection. The section of the item of laundry that is guided along the guideway in the direction of the clamp mouth encounters resistance in this projection. Due to this resistance, a force or torque is exerted on the clamping lever, causing it to move and thereby open the clamp mouth or the opening of the clamp mouth. With the opening of the clamp mouth being opened by the clamping lever, the section of the item of laundry can enter the opening of the clamp mouth. This hooked projection can also be a region of the guideway which has a different sliding resistance.

The second end of the clamping lever facing away from the clamp mouth is configured such that it projects beyond the clamp housing. By exerting force or torque on the upper side of the second end of the clamping lever, the opening of the clamp mouth can likewise be actuated.

A special embodiment of the present invention is also possible in that the clamping lever is mounted on the clamp housing to pivot about a pivot axis, preferably with the clamping lever being assigned a restoring means, in particular a spring, which preloads the clamping lever in the sense of closing the clamp mouth. In an initial position, the first end of the clamping lever is tensioned by the restoring means against the clamp mouth or against a bridge of the clamp mouth. If the section of the item of laundry is moved against the hooked projection as it slides along the guideway, this causes a torque to be exerted on the clamping lever, which pivots the clamping lever back against the preload. As soon as the operator no longer exerts any force upon the clamping lever, the latter pivots back on account of its spring preload, clamping the section of the item of laundry between the first end of the clamping lever and the clamp mouth, or the bridge of the clamp mouth. As a result, the item of laundry is fixed in the clamp. When a force is exerted on the upper side of the second end of the clamping lever, the latter can be pivoted against its preload, so that the section of the item of laundry is again released. The spring can take the form of a leg spring that is tensioned between the clamp housing and the clamping lever. But it is also conceivable that the restoring means is a different type of mechanical spring or, for example, a magnet or electromagnet.

Furthermore, the invention can provide that the pivot axis is arranged at an approximately centered position between the ends of the clamping lever, preferably being positioned closer to the first end of the clamping lever or closer to the second end, respectively. When the pivot axis is positioned closer to the first end of the clamping lever, this increases the lever action of the force acting on the second end for opening the clamp mouth. On the other hand, by enlarging the distance from the pivot axis to the first end of the clamping lever, the force required by the operator to overcome the preload force can be reduced.

As particularly advantageous is the further provision that, for the purpose of introducing the section of the item of laundry into the clamp mouth, the item of laundry with this section can be moved along the guidance means of the insertion aid, in particular of the guideway which forms it, preferably in a flowing movement from the second end of the clamping lever to the first end of the clamping lever. In this case, the guideway is configured such that the section of the item of laundry does not have to be set down or reoriented during this movement. The section of the item of laundry involved here can be an edge piece, for example, which is gripped by the operator with one or both hands and fed to the clamp.

In addition, the invention can provide that the clamping lever for inserting the item of laundry into the clamp mouth can be moved against the preload of the restoring means, preferably the spring, while the section of the item of laundry slides along the guidance means or its guideway. Since the clamping lever is already pivotable during the entire movement of the section of the item of laundry on the guide track, the clamp mouth can already be in an open position when the section of the item of laundry reaches the first end of the clamping lever.

In particular it is preferably provided that the section of the item of laundry can be fixed in the clamp mouth by the first end of the clamping lever through the spring preload of the clamping lever. By virtue of this fixation of the item of laundry, it can be fed to any other treatment station via a transport system. The treatment station can, however, also be a collection container or a sorting bin.

One special embodiment of the present invention can be constituted in that the clamp housing is assigned a plurality of, preferably two, clamping levers and/or clamp mouths, which preferably can be jointly actuated. In this case, the clamping levers have a parallel configuration and can be opened and closed equally by the application of torque. By employing a plurality of clamping levers, either a relatively large section of an item of laundry can be picked up, or a plurality of individual items of laundry can be picked up at the same time. Here provision is also made that the clamping levers can be provided with items of laundry individually as well as actuated to pick up an item of laundry in common.

It is further provided by the invention that clamping levers are arranged at a distance to one another on a common clamp housing and preferably that each clamping lever is assigned its own clamp mouth bridge. Such a clamp mouth bridge is part of the clamp mouth and serves as a counter piece to the clamping lever for the purpose of fixing the item of laundry. Such a clamp mouth bridge has the same width as the corresponding clamping lever. Since two spaced-apart clamping levers have two equally spaced-apart clamp mouth bridges, it is possible, when transferring the item of laundry from one clamp to a following clamp, for the following clamp to grip the item of laundry between, or around, the clamping levers of the first clamp.

It is provided by the invention that a loading station has means that are assigned to a conveyer and these means have a plurality of clamps of the type according to the invention. Such means can, for example, have a fork-shaped configuration, with a clamp being positioned in each case at the free ends of the fork-shaped means. A single item of laundry can be inserted into each of these clamps or a common item of laundry can be inserted into all clamps. The items of laundry are then fed by the means via the transport belt to further processing stations.

BRIEF DESCRIPTION OF THE DRAWINGS

Further features, advantages and details of the invention are provided in the following description of preferred exemplary embodiments of the invention, which in the following are described in more detail on the basis of the drawings, in which.

DETAILED DESCRIPTION OF PREFERRED EMBODIMENTS

Figure 1:
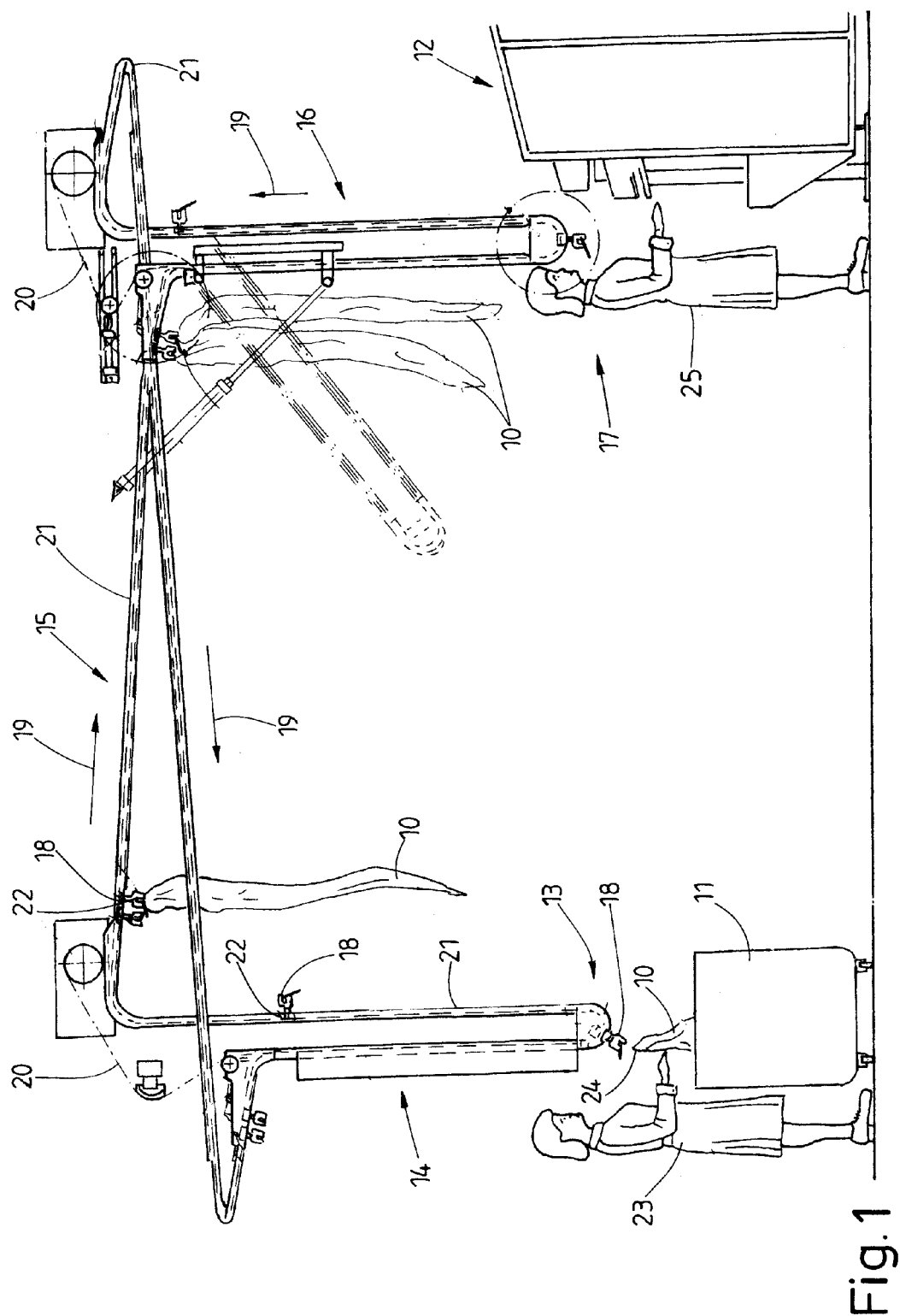
FIG. 1 shows a reduced-scale, schematic representation of an apparatus for feeding items of laundry to a mangle.

The arrangement shown in FIG. 1 for delivering items of laundry 10 from a laundry hamper 11 to a mangle feeder 12 comprises a loading station 13, a vertical conveying section 14 in the region of the loading station 13, a gravity conveying section 15, a vertical conveying section 16 and a removal station 17 in front of the mangle feeder.

The items of laundry 10 are supplied by means of clamps 18, which are moved and guided in circulation in the feeding arrangement in the direction of the arrow 19. Here the clamps 18 in the region of each vertical conveying section 14, 16 are coupled with an endless conveying element, configured here as conveying chain 20, which runs in a guide configured as a profiled rail 21.

The clamps 18 are each disposed on a carriage 22 that is moveable in the profiled rail 21. The clamps 19 move via the carriages 22 along the conveying section 16 in the direction of arrow 19. For feeding the items of laundry 10, an operator 23 removes an item of laundry 10 from the laundry hamper 11 and feeds a section 24 of the item of laundry 10 to the clamp 18. The section 24 of the item of laundry 10 is fixed in the clamp 18 and taken away along the conveying section 16. At another end of the conveying section 16 another operator 25 removes the item of laundry 10 from the clamp 18 and introduces it to a further treatment station, for example, a mangle feeder 12. This transfer to a further treatment station can also be carried out automatically.

The present invention of a clamp for an item of laundry is not limited to the application example of the clamps 18 according to the invention in a feeding arrangement as illustrated in FIG. 1. Instead, the clamps 18 according to the invention can be employed in any other kind of laundry installation.

Figure 2:
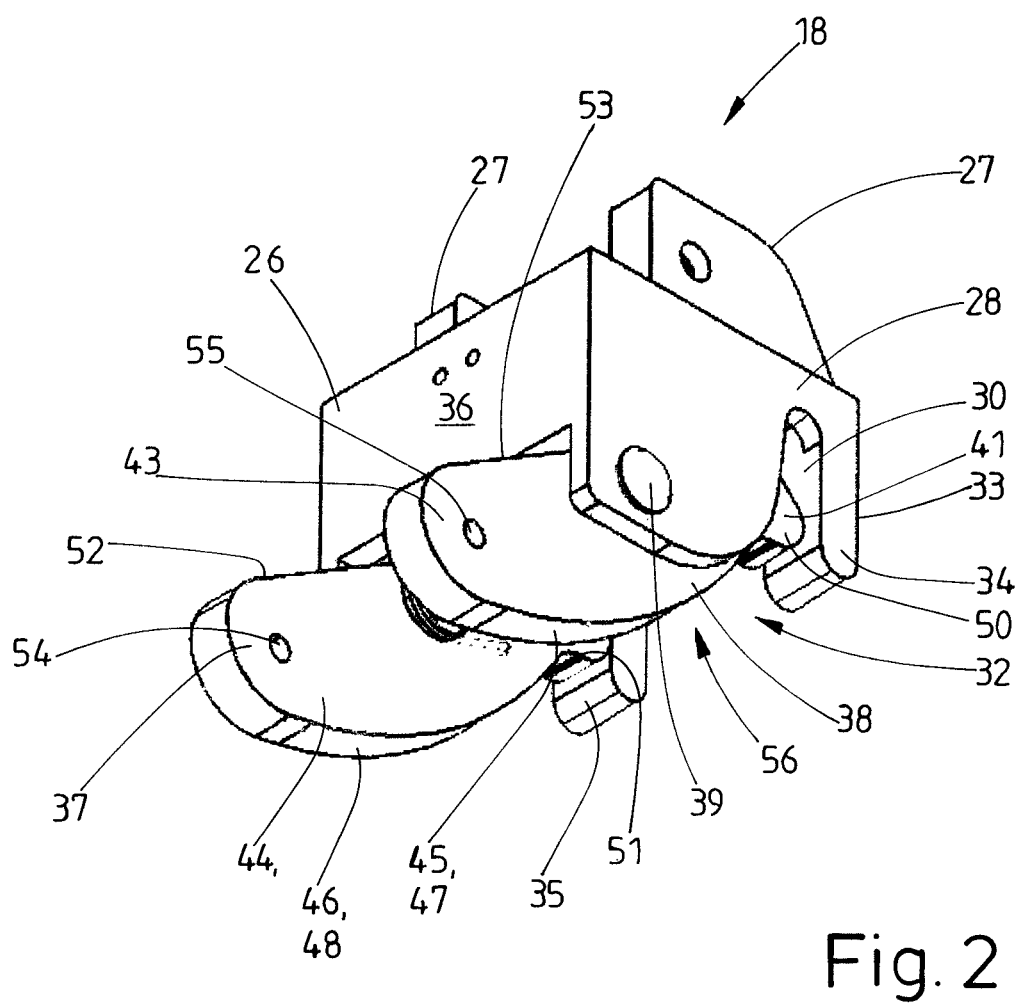
FIG. 2 shows a perspective view of a clamp for an item of laundry.

The clamps 18 for receiving an item of laundry 10 essentially exhibit a clamp housing 26 (FIG. 2). This clamp housing 26 has mounting means 27 for the attachment to a carriage 22 of a conveying chain 20, for example. The mounting means 27 is attached, preferably displaceably attached, to the carriage 22 by means of fastening elements, for example (not shown). The clamp housing 26 has essentially a box-shaped configuration, with at least one side being open. The two opposing side walls 28 and 29 each have wedge-shaped or parabola-shaped slots 30, 31, which together form a clamp mouth 32. The clamp mouth 32 has a vertical orientation and is open downwards. On a front side 33 of the clamp 18 the latter has a large-area opening 56, thus forming, together with the slots 30, 31, two clamp mouth bridges 34, 35. The rear side 36 of the clamp 18 located opposite the front side 33 is essentially closed, but may also have openings for further elements of the clamp 18.

In the exemplary embodiment of the clamp 18 shown in FIG. 2, the clamp housing 26 is assigned two clamping levers 37, 38. The clamping levers 37, 38 are connected to each other and to the housing 26 by means of a pivot axis 39. The clamping levers 37 and 38 can be moved about the pivot axis jointly or individually. Furthermore, the clamping levers 37, 38 and the clamp housing 26 are associated via the pivot axis 39 with a common spring 40 or a leg spring. A preload is exerted by the spring 40 on the clamping levers 37, 38 such that the clamping levers 37, 38 are tensioned in an initial position or resting position.

The clamping levers 37, 38 have an elongated shape, with a first end 41, 42 protruding into the clamp housing 26 or into the clamp mouth 32 and a second end 43, 44 projecting out of the clamp housing 26. Positioned between the first end 41, 42 and the second end 43, 44 is the pivot axis 39. The pivot axis 39 is arranged at a centered position between the ends 41, 42 and 43, 44. But the invention also provides for positioning the pivot axis 39 closer to one end 41, 42 or 43, 44 for achieving better lever action.

An underside 45, 46 of the clamping levers 37, 38 is configured as a guidance means or guideway 47, 48. This guideway 47, 48 of the clamping levers 37, 38 serves as an aid for inserting at least one section 24 of the item of laundry 10 into the clamp mouth 32. Here the underside 45, 46 of the clamping levers 37, 38 can have a skid-like configuration with a level or flat or curved surface.

The guideway 47, 48 between the second end 43, 44 and the first end 41, 42 is obliquely oriented relative to the clamp housing 26 or relative to a horizontal plane, with the result that the distance to an underside 49 of the clamp housing 26 continuously decreases in the direction of the first end 41, 42. Here the guideway 47, 48 has a straight-line configuration, or one that is slightly convex or concave. It is preferably provided that the guideway 47, 48 leading to the first end 41, 42 is similar or identical to the curvature or incline of the slot 30, 31 or of the clamp mouth 32.

The first end 41, 42 of the clamping lever 37, 38 has a nose-like projection 50, 51. Due to the preloading of the spring 40, the clamping lever 37, 38 presses against the clamp mouth bridge 34, 35 with this projection 50, 51. When pressure is applied to the projection 50, 51, the clamping lever 37, 38 pivots about the pivot axis 39 against the preload force of the spring 40 such that the first end 41, 42 of the clamping lever 37, 38 opens the clamping mouth 32.

As soon as no force is any longer exerted on the projection 50, 51 of the first end 41, 42, the preloaded spring 40 causes the first end 41, 42 to move back to its initial position in which the projection 50, 51 is in contact with the clamp mouth bridge 34, 35.

The second end 43, 44 of the clamping lever 37, 38 has a free upper side 52, 53. By exerting force on this upper side 52, 53 the clamping lever 37, 38 can likewise be pivoted from its resting position about the pivot axis 39 and thus open the clamping mouth 32. The force exerted on the clamping lever 37, 38 can be applied manually or automatically, or by machine. The second end 43, 44 of the clamping lever 37, 38 has an opening 54, 55 for an actuating element (not shown) by means of which the clamping lever 37, 38 can be moved about the pivot axis 39.

The width of the clamping levers 37, 38 is dimensioned such it correspond to the width of the clamp mouth bridges 34, 35. This results in the opening 56 in the clamp mouth 32 at the front side 33 of the clamp housing 26.

Figure 3:
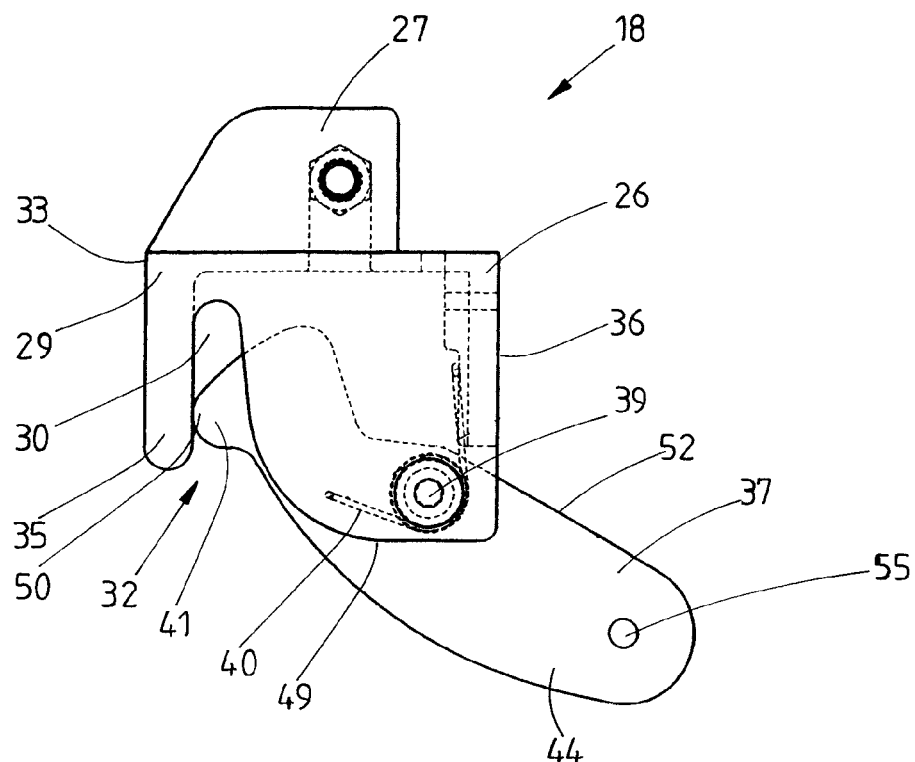
FIG. 3 shows a side view of the clamp.
Figure 4:
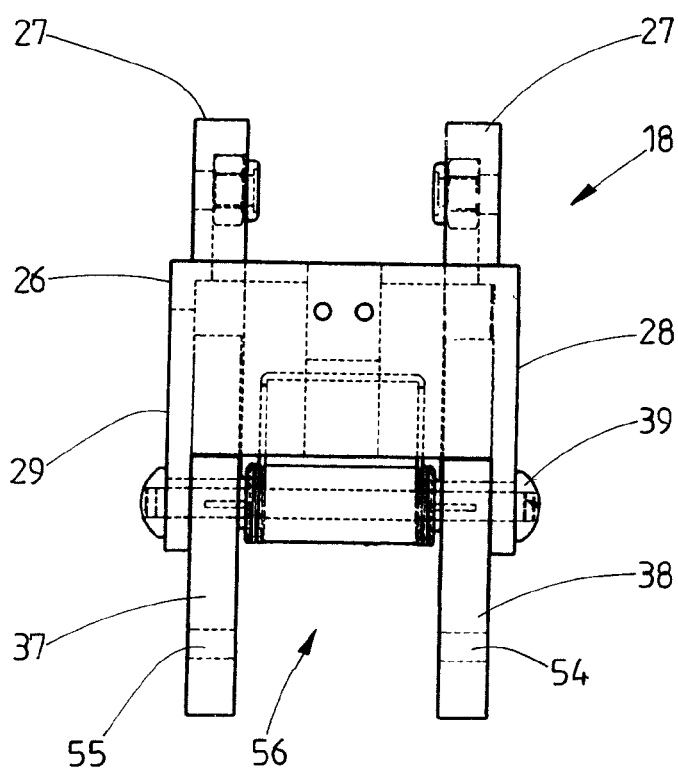
FIG. 4 shows a side view of the clamp.

The number of clamping levers 37, 38 of a clamp 18 and their shape are not restricted to the exemplary embodiment shown in FIGS. 2 to 4. In fact, provision can be made for the clamp 18 to have only one clamping lever or a plurality of parallel clamping levers. In addition, it is conceivable that the carriage 22 of the conveyor chain 20 has a plurality of clamps 18 aligned parallel to each other. It is also conceivable for the clamping levers to have a different form, for instance one that is more cuboid in shape.

The clamp housing can be made of metal or synthetic material. The clamping levers 37, 38, in particular the guideway 47, 48, can be made of metal or synthetic material. It is preferably provided that the guideway 47, 48 is made of a material having a low sliding resistance, such as Teflon® brand of synthetic material.

When the item of laundry 10 is fed into the clamp 18, the rear side 36 of the clamp 18 faces the operator 23. For the transport of the item of laundry 10 by the clamp 18, an operator 23 feeds a section 24, in particular a corner, an edge or the like, of the item of laundry 10 into the clamp 18. In the process the operator 23 grips the section 24 of the item of laundry 10 and guides it to contact any part of the guideway 47, 48. By virtue of the operator 23 exerting a slight pressure on the section 24 of the item of laundry 10, while sliding it along the guideway 47, 48, the section 24 is guided along the obliquely directed underside 45, 46 in the direction of the first end 41, 42 of the clamping lever 37, 38. Here it is of no consequence as to which position between the first end 41, 42 and the second end 43, 44 of the clamping lever 37, 38 the operator 23 applies the section 24. Due to the aforementioned pressure exerted by the operator 23, the part 24 is always directed along the guideway 47, 48 in the direction of the clamp mouth or the first end 41, 42. Since the guideway 47, 48 has a linear configuration, the section 24 of the item of laundry 10 can be fed to the clamp mouth 32 in a flowing movement.

When the section 24 of the item of laundry 10 presses against the projection 50, 51, the slight pressure exerted by the operator 23 overcomes the preload force of the spring 40 and the clamping lever 37, 38 pivots back about the pivot axis 39, thus causing the first end 41, 42 to expose the clamping mouth 32. As soon as the section 24 of the item of laundry 10 is located in the clamp mouth 32, the operator 23 lets loose of the part 24. Since no force is further exerted on the clamping lever 37, 38, the latter moves back into its initial position due to the preload force of the spring 40. In the process, the section 24 of the item of laundry 10 is pressed by the projection 50, 51 against the clamp mouth 34, 35 and thereby fixed in place. The item of laundry 10 is now fixed in the clamp 18 such that it can be carried away by a conveying system.

For removing the item of laundry 10 from the clamp 18, another operator 25 moves the second end 43, 44 downwards, thus causing the first end 41, 42 to open the clamp mouth 32 again and the section 24 of the item of laundry 10 to fall out of the clamp mouth 32. However, it is preferably provided that the clamp 18 is automatically opened by exerting force or pressure on the upper side 52, 53 of the second end 43, 44.

LIST OF DESIGNATIONS 10 item of laundry
11 laundry hamper
12 mangle feeder
13 loading station
14 conveying section
15 gravity conveying section
16 conveying section
17 removal station
18 clamp
19 arrow direction
20 conveyor chain
21 profiled rail
22 carriage
23 operator
24 section
25 operator
26 clamp housing
27 mounting means
28 side wall
29 side wall
30 slot
31 slot
32 clamp mouth
33 front side
34 clamp mouth bridge
35 clamp mouth bridge
36 rear side
37 clamping lever
38 clamping lever
39 pivot axis
40 spring
41 first end
42 first end
43 second end
44 second end
45 underside
46 underside
47 guideway
48 guideway
49 underside
50 projection
51 projection
52 upper side
53 upper side
54 opening
55 opening
56 opening

What is claimed is:

1. A clamp (18) for an item of laundry (10), comprising:
a clamp housing (26);
a clamp mouth (32);
at least one movable clamping element comprising at least one clamping lever (37, 38) pivotally mounted on the clamp housing (26) about a pivot axis (39), the at least one clamping lever (37, 38) having a first end (41, 42) configured as a nose-like projection (50, 51) protruding into the clamp mouth (32); and
a common preloaded spring (40) for preloading the at least one clamping lever (37, 38),
wherein the at least one clamping lever (37, 38) comprises an insertion aid having a guideway (47, 48) for the guided insertion of a section (24) of the item of laundry (10) into the clamp mouth (32), wherein the guideway (47, 48) ascends diagonally on an underside of the clamp housing (26) toward the clamp mouth (32) and extends into the clamp mouth (32).

2. The clamp (18) as claimed in claim 1, wherein the guideway (47, 48) lies with its entire length below an opening of the clamp mouth (32).

3. The clamp (18) as claimed in claim 1, wherein the distance of the guideway (47, 48) to the clamp mouth (32) decreases continually.

4. The clamp (18) as claimed in claim 1, wherein the guideway (47, 48) ascends obliquely from below the clamp housing (26) to the clamp mouth (32) and has a linear configuration.

5. The clamp (18) as claimed in claim 1, wherein the guideway (47, 48) ascends obliquely from below the clamp housing (26) to the clamp mouth (32) and has a curved configuration.

6. The clamp (18) as claimed in claim 1, further comprising a second end (43, 44) projecting beyond the clamp housing (26), with the guideway (47, 48) running between the first end (41, 42) and the second end (43, 44) of the clamping lever (37, 38) on an underside (45, 46) of the clamping lever (37, 38).

7. The clamp (18) as claimed in claim 6, wherein the section (24) of the item of laundry (10) is fixable in the clamp mouth (32) by the first end (41, 42) of the clamping lever (37, 38) through the common spring (40) of the clamping lever (37, 38).

8. The clamp (18) as claimed in claim 1, wherein the common spring (40) is a restoring means which preloads the clamping lever (37, 38) so as to close the clamp mouth (32).

9. The clamp (18) as claimed in claim 8, wherein the clamping lever (37, 38) for inserting the section (24) of the item of laundry (10) into the clamp mouth (32) is movable against the preload of the restoring means while the section (24) of the item of laundry (10) slides along the guideway (47, 48).

10. The clamp (18) as claimed in claim 9, wherein the clamping lever (37, 38) for inserting the section (24) of the item of laundry (10) into the clamp mouth (32) is movable against the preload of the restoring means while the section (24) of the item of laundry (10) slides along the guideway (47, 48).

11. The clamp (18) as claimed in claim 1, wherein the pivot axis (39) is arranged at an approximately centered position between the first end (41, 42) and the second end (43, 44) of the clamping lever (37, 38).

12. The clamp (18) as claimed in claim 1, wherein the pivot axis (39) of the clamping lever (37, 38) is positioned closer to the first end (41, 42) of the clamping lever (37, 38).

13. The clamp (18) as claimed in claim 1, wherein the pivot axis (39) of the clamping lever (37, 38) is positioned closer the second end (43, 44) of the clamping lever (37, 38).

14. The clamp (18) as claimed in claim 1, wherein, for the purpose of introducing the section (24) of the item of laundry (10) into the clamp mouth (32), the item of laundry (10) with this section (24) is movable along the guideway (47, 48).

15. The clamp (18) as claimed in claim 1, wherein the clamp housing (26) comprises a plurality of the clamp mouths (32).

16. The clamp (18) as claimed in claim 15, wherein the plurality of the clamping levers (37, 38) are arranged at a distance relative to one another and are mounted on a common clamp housing (26).

17. The clamp (18) as claimed in claim 16, wherein the clamp housing (26) further comprises at least one clamp mouth bridge (34, 35), wherein each of the plurality of the clamping levers (37, 38) is assigned its own one of the at least one clamp mouth bridge (34, 35).

18. The clamp (18) as claimed in claim 1, wherein the clamp housing (26) comprises a plurality of the clamping levers (37, 38) that are jointly actuatable.

* * * * *